(12) United States Patent
Lyu et al.

(10) Patent No.: US 8,243,235 B2
(45) Date of Patent: Aug. 14, 2012

(54) LIQUID CRYSTAL DISPLAY DEVICE

(75) Inventors: Ki-Hyun Lyu, Gwacheon-si (KR); Dae-Hyun Kim, Seoul (KR); Jun-Yeob Lee, Daegu (KR); Sang-Moo Song, Gumi-si (KR); Sang-Bum Ko, Gumi-si (KR); In-Ho Hwang, Seoul (KR); Su-Hong Cho, Busan (KR)

(73) Assignee: LG Display Co., Ltd., Seoul (KR)

( * ) Notice: Subject to any disclaimer, the term of this patent is extended or adjusted under 35 U.S.C. 154(b) by 155 days.

(21) Appl. No.: 12/270,381

(22) Filed: Nov. 13, 2008

(65) Prior Publication Data

US 2009/0135351 A1 May 28, 2009

(30) Foreign Application Priority Data

Nov. 26, 2007 (KR) .................... 10-2007-0121028

(51) Int. Cl.
*G02F 1/1333* (2006.01)
*G02F 1/1335* (2006.01)

(52) U.S. Cl. ........................ 349/106; 349/110
(58) Field of Classification Search ........... 349/106–111
See application file for complete search history.

(56) References Cited

U.S. PATENT DOCUMENTS

| | | | | |
|---|---|---|---|---|
| 2001/0048498 | A1* | 12/2001 | Tomioka et al. | 349/123 |
| 2002/0075429 | A1* | 6/2002 | Fujioka et al. | 349/106 |
| 2004/0179153 | A1* | 9/2004 | Yeh et al. | 349/106 |
| 2004/0233352 | A1* | 11/2004 | Chen | 349/106 |
| 2004/0246410 | A1* | 12/2004 | Kim | 349/110 |
| 2005/0231669 | A1* | 10/2005 | Kim | 349/138 |
| 2006/0103799 | A1* | 5/2006 | Ikeda et al. | 349/124 |

FOREIGN PATENT DOCUMENTS

| | | |
|---|---|---|
| CN | 1537254 A | 10/2004 |
| CN | 1831608 A | 9/2006 |

OTHER PUBLICATIONS

Office Action issued in corresponding Chinese Patent Application No. 200810182353.2; issued Jan. 8, 2010.

* cited by examiner

*Primary Examiner* — Jessica M Merlin
(74) *Attorney, Agent, or Firm* — Brinks Hofer Gilson & Lione

(57) ABSTRACT

A liquid crystal display device includes an array substrate including gate and data line on a first substrate to define first and second sub-pixel regions and a thin film transistor in each of the first and second sub-pixel regions; a color filter substrate including a color filter layer including first and second color filters corresponding to the first and second sub-pixel regions, respectively, a portion of the first color filter overlapping a portion of the second color filter over the data line; and a liquid crystal layer between the array substrate and the color filter substrate.

6 Claims, 6 Drawing Sheets

LIQUID CRYSTAL DISPLAY DEVICE

The present invention claims the benefit of Korean Patent Application No. 2007-0121028, filed in Korea on Nov. 26, 2007, which is hereby incorporated by reference for all purposes as if fully set forth herein.

BACKGROUND OF THE INVENTION

1. Field of the Invention

The present invention relates to a liquid crystal display device.

2. Discussion of the Related Art

Until recently, display devices have typically used cathode-ray tubes (CRTs). Presently, many efforts and studies are being made to develop various types of flat panel displays, such as liquid crystal display (LCD) devices, plasma display panels (PDPs), field emission displays, and electro-luminescence displays (ELDs), as a substitute for CRTs. Of these flat panel displays, LCD devices have many advantages, such as high resolution, light weight, thin profile, compact size, and low voltage power supply requirements.

In general, an LCD device includes two substrates that are spaced apart and face each other with a liquid crystal material interposed between the two substrates. The two substrates include electrodes that face each other such that a voltage applied between the electrodes induces an electric field across the liquid crystal material. Alignment of the liquid crystal molecules in the liquid crystal material changes in accordance with the intensity of the induced electric field into the direction of the induced electric field, thereby changing the light transmissivity of the LCD device. Thus, the LCD device displays images by varying the intensity of the induced electric field.

Recently, IPS mode LCD (in-plane switching mode LCD) devices have been proposed. The IPS-LCD device is operated by an in-plane electric field. Accordingly, the IPS mode LCD devices achieve a wide viewing angle compared to LCD devices operated by a vertically induced electric field.

Figure 1:
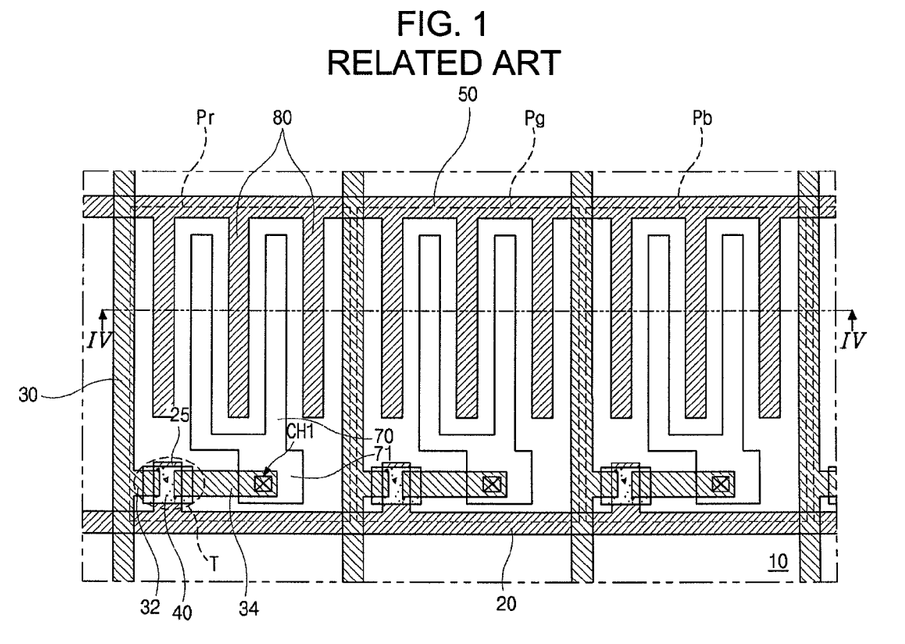
FIG. 1 is a plan view illustrating an array substrate of an IPS mode LCD device according to the related art.
Figure 2:
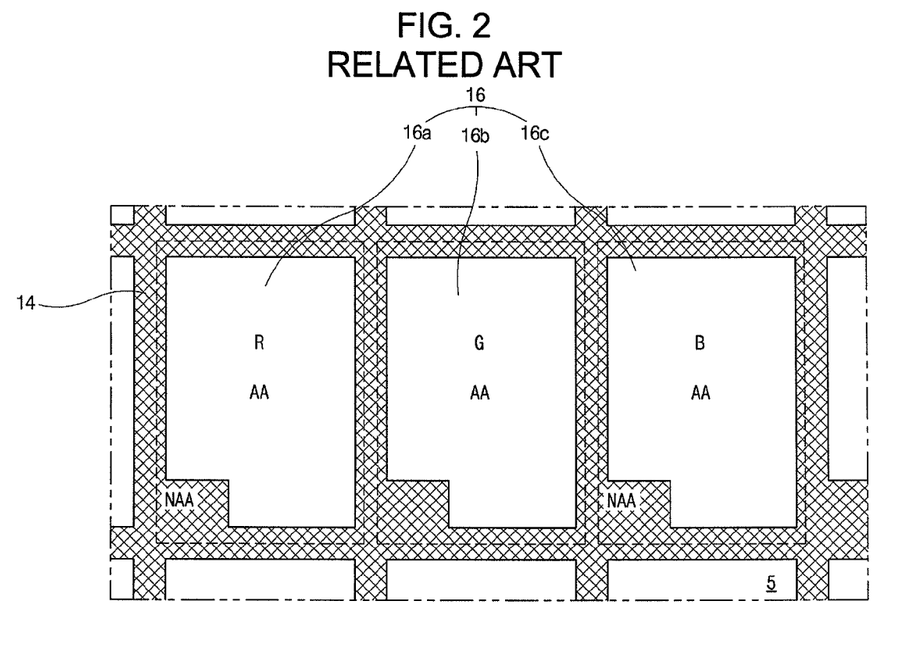
FIG. 2 is a plan view illustrating a color filter substrate of the IPS mode LCD device according to the related art.

FIG. 1 is a plan view illustrating an array substrate of an IPS mode LCD device according to the related art, and FIG. 2 is a plan view illustrating a color filter substrate of the IPS mode LCD device according to the related art.

Referring to FIGS. 1 and 2, the IPS mode LCD device includes a display region AA and a non-display region NAA. The display region AA transmits light to display images, and the non-display region NAA is a region not to display images and between the display regions AA.

The array substrate includes a gate line 20 and a data line 30 on a first substrate 10 to cross each other to define a sub-pixel region. The sub-pixel region includes red (R), green (G) and blue (B) sub-pixel regions Pr, Pg and Pb. A common line 50 is spaced apart from the gate line 20.

A thin film transistor T is in the sub-pixel region and connected to the corresponding gate and data lines 20 and 30. The thin film transistor T includes a gate electrode 25, a semiconductor layer 40, and source and drain electrodes 32 and 34. The semiconductor layer 40 includes an active layer made of intrinsic amorphous silicon and an ohmic contact layer made of extrinsic amorphous silicon.

A pixel electrode 70 is formed in the sub-pixel region. The pixel electrode 70 is connected to the drain electrode 34 through a connection portion 71. The connection portion 71 contacts the drain electrode 34 through a drain contact hole CH1.

A common electrode 80 is connected to the common line 50. The common electrode 80 and the pixel electrode 70 are alternately arranged in the pixel region.

The color filter substrate includes a color filter layer 16, which includes red, green and blue color filters 16a, 16b and 16c corresponding to the red, green and blue sub-pixel regions Pr, Pg and Pb, respectively, and a black matrix 14. The black matrix 14 blocks light from being emitted from the non-display region.

Figure 3:
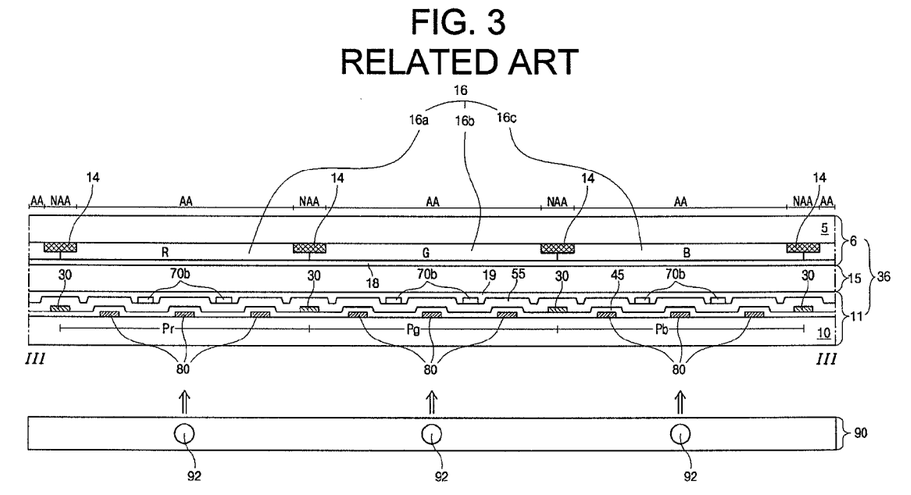
FIG. 3 is a cross-sectional view illustrating the IPS mode LCD device taken along a line III-III of FIG. 1.

FIG. 3 is a cross-sectional view illustrating the IPS mode LCD device taken along a line III-III of FIG. 1.

Referring to FIG. 3, the IPS mode LCD device includes a liquid crystal panel 36 including an array substrate 11, a color filter substrate 6 and a liquid crystal layer 15 therebetween, and a backlight unit 90 below the liquid crystal panel 36. A seal pattern (not shown) is used to attach the array substrate 11 and the color filter substrate 6 and formed at peripheral regions of the array substrate 11 and the color filter substrate 6.

The backlight unit 90 includes a plurality of lamps 92 to supply light to the liquid crystal panel 36.

In the array substrate 11, a common electrode 80 is formed on a first substrate 10. A gate insulating layer 45 is formed on the common electrode 80. A data line 30 is formed on the gate insulating layer 45. A passivation layer 55 is formed on the data line 30. A pixel electrode 70 and a connection portion 71 are formed on the passivation layer 55. A first alignment layer 19 is formed on the pixel electrode 70. The data line 30 crosses the gate line (20 of FIG. 1) to define red (R), green (G) and blue (B) sub-pixel regions Pr, Pg and Pb. The common and pixel electrodes 80 and 70 are alternatively arranged in the sub-pixel region.

In the color filter substrate 6, a black matrix 14 is formed corresponding to a non-display region NAA. A color filter layer 16 includes red, green and blue color filters 16a, 16b and 16c corresponding to the red, green and blue sub-pixel regions Pr, Pg and Pb. A second alignment layer 18 is formed on the color filter layer 16.

The black matrix 14 shields the gate line, the data line 30 and the thin film transistor (T of FIG. 1) to prevent light leakage through the non-display region NAA. In a case that the black matrix 14 coincides with the gate line, the data line 30 and the thin film transistor, when misalignment between the array substrate and the color filter substrate occurs, the black matrix 14 may not shield the gate line, the data line 30 and the thin film transistor and the light leakage may occur. To prevent this, the black matrix 14 has a margin so that the black matrix 14 has a width greater than those of the gate line, the data line 30 and the thin film transistor. However, this causes aperture ratio to be reduced.

Recently, to maximize aperture ratio, eliminating the black matrix in the color filter substrate is suggested.

Figure 4:
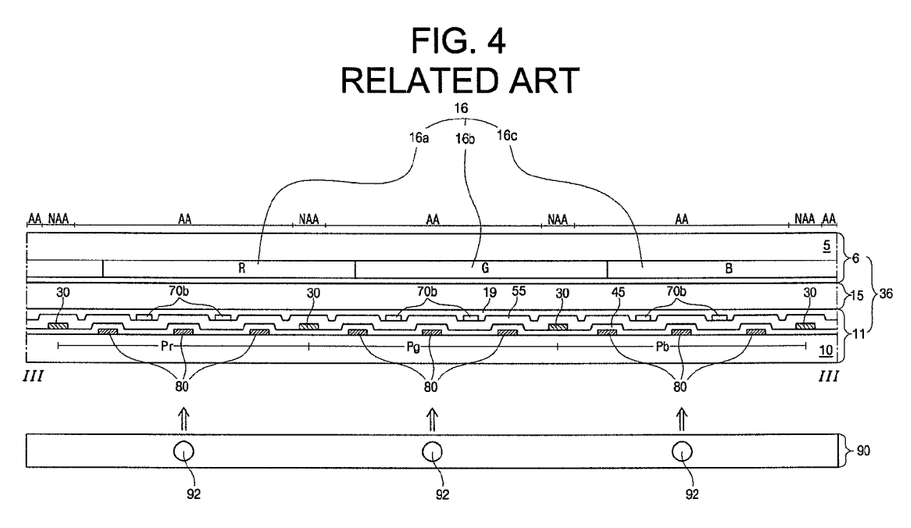
FIG. 4 is a cross-sectional view illustrating an IPS mode LCD device not including a black matrix according to the related art.

FIG. 4 is a cross-sectional view illustrating an IPS mode LCD device not including a black matrix according to the related art. FIG. 4 shows that a color filter substrate is misaligned with an array substrate. Explanations of parts similar to parts of FIG. 3 may be omitted.

Referring to FIG. 4, the color filter substrate does not include a black matrix. Accordingly, the IPS mode LCD device of FIG. 4 has aperture ratio greater than the IPS mode LCD device of FIG. 3.

When the array substrate 11 and the color filter substrate 6 are attached, the color filter substrate 6 may be misaligned to the array substrate 11 and shifted relatively to the array substrate. For example, the color filter substrate 6 is shifted to the right direction, as shown in FIG. 4. Accordingly, the color filter 16a, 16b and 16c may be located in the corresponding sub-pixel region and the next sub-pixel region in the right direction as well. For example, a right edge portion of the red color filter 16*a* overlaps the green sub-pixel region Pg, a right edge portion of the green color filter 16*b* overlaps the blue sub-pixel region Pb, and a right edge portion of the blue color filter 16*c* overlaps the red sub-pixel region Pr.

In a normal state, the red, green and blue color filters 16*a*, 16*b* and 16*c* function to filter white light emitted from the backlight unit 90, and emit the red, green and blue lights, respectively. However, when the red, green and blue color filters 16*a*, 16*b* and 16*c* are shifted and overlap the pixel regions right thereto, defect such as color mixture occurs. For example, the red color filter 16*a* is shifted and overlaps the green sub-pixel region Pg. Accordingly, the green sub-pixel region Pg abnormally emits a mixture of a red light and a green light. In similar, mixed colors are emitted in the red and blue sub-pixel regions Pr and Pb. Accordingly, display quality is degraded. Further, this problem may occur to other mode LCD devices not using a black matrix.

SUMMARY OF THE INVENTION

A liquid crystal display device includes an array substrate including gate and data line on a first substrate to define first and second sub-pixel regions and a thin film transistor in each of the first and second sub-pixel regions; a color filter substrate including a color filter layer including first and second color filters corresponding to the first and second sub-pixel regions, respectively, a portion of the first color filter overlapping a portion of the second color filter over the data line; and a liquid crystal layer between the array substrate and the color filter substrate.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to illustrated embodiments of the present invention, which are illustrated in the accompanying drawings.

Figure 5:
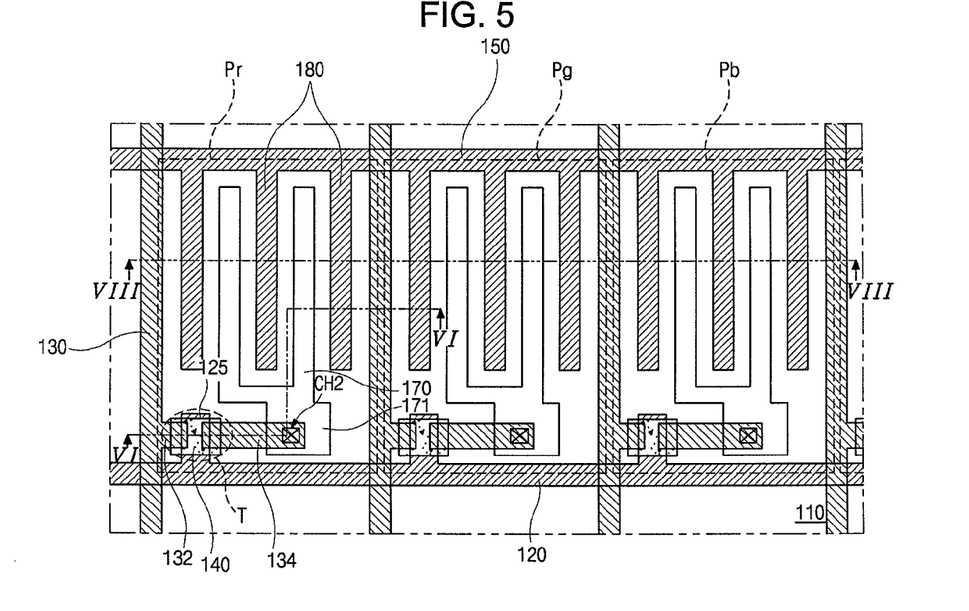
FIG. 5 is a plan view illustrating an array substrate of an IPS mode LCD device according to an embodiment of the present invention.
Figure 6:
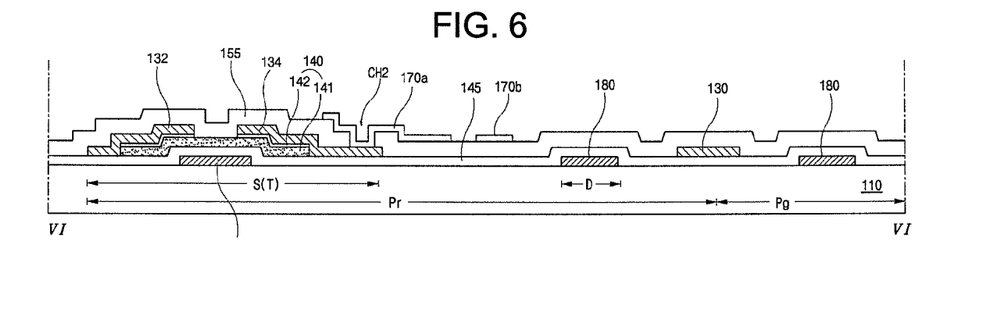
FIG. 6 is a cross-sectional view taken along a line VI-VI of FIG. 5.
Figure 7:
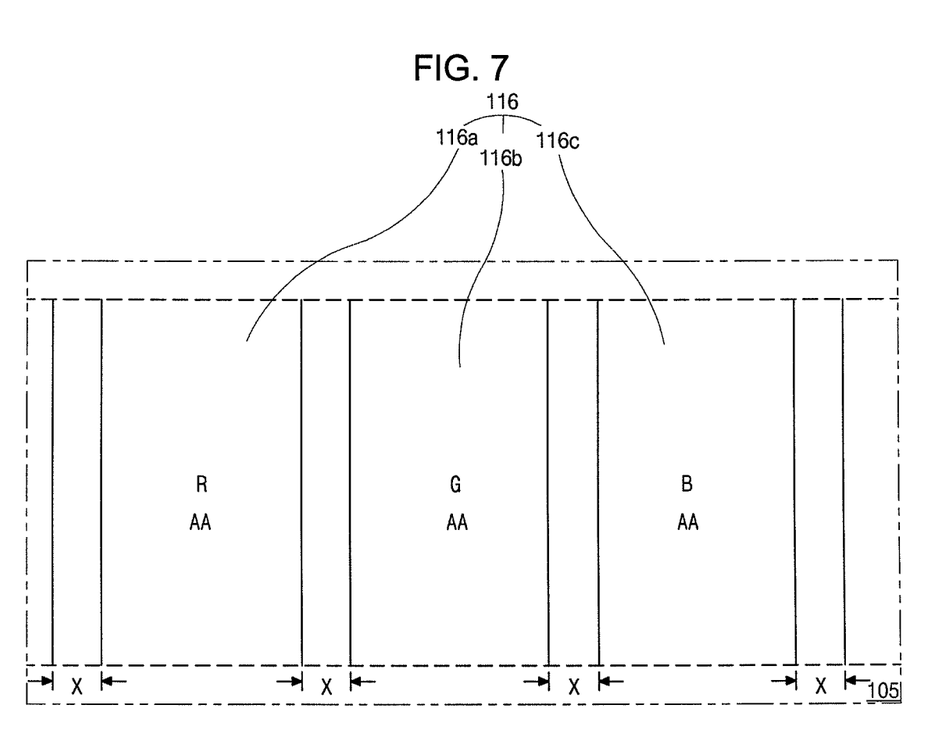
FIG. 7 is a plan view illustrating a color filter substrate of the IPS mode LCD device according to the embodiment of the present invention.

FIG. 5 is a plan view illustrating an array substrate of an IPS mode LCD device according to an embodiment of the present invention, FIG. 6 is a cross-sectional view taken along a line VI-VI of FIG. 5, and FIG. 7 is a plan view illustrating a color filter substrate of the IPS mode LCD device according to the embodiment of the present invention.

Referring to FIGS. 5-7, the array substrate includes a gate line 120 and a data line 130 on a first substrate 110 to cross each other to define a sub-pixel region. The sub-pixel region includes red (R), green (G) and blue (B) sub-pixel regions Pr, Pg and Pb. A common line 150 is spaced apart from the gate line 120. The data line 130 is in a data region D.

A thin film transistor T is in a switching region S of the sub-pixel region and connected to the corresponding gate and data lines 120 and 130. The thin film transistor T includes a gate electrode 125, a semiconductor layer 140, and source and drain electrodes 132 and 134. The semiconductor layer 140 includes an active layer 141 made of intrinsic amorphous silicon and an ohmic contact layer 142 made of extrinsic amorphous silicon.

A pixel electrode 170 is formed in the sub-pixel region. The pixel electrode 170 is connected to the drain electrode 134 through a connection portion 171. The connection portion 171 contacts the drain electrode 134 through a drain contact hole CH2.

A common electrode 180 is connected to the common line 50. The common electrode 180 and the pixel electrode 170 are alternately arranged in the sub-pixel region.

A gate insulating layer 145 is formed on the gate line 120, the gate electrode 125, the common line 150, and the common electrode 180. The semiconductor layer 140 is formed on the gate insulating layer 145. The source and drain electrodes 132 and 134 are spaced apart from each other on the semiconductor layer 140. A passivation layer 155 is formed on the data line 130, and the source and drain electrodes 132 and 134. The passivation layer 155 includes the drain contact hole CH2 exposing the drain electrode 134. The pixel electrode 170 and the connection portion 171 are formed on the passivation layer 155.

The color filter substrate includes a color filter layer 116 on a second substrate 105. The color filter layer 116 includes red, green and blue color filters 116*a*, 116*b* and 116*c* corresponding to the red, green and blue sub-pixel regions Pr, Pg and Pb, respectively. The adjacent color filters 116*a*, 116*b* and 116*c* may overlap each other with an overlapping width X between adjacent display regions M. For example, the red and green color filter 116*a* and 116*b* overlap each other at a border portion of the red and green sub-pixel regions Pr and Pg, the green and blue color filter 116*b* and 116*c* overlap each other at a border portion of the red and green sub-pixel regions Pg and Pb, and the blue and red color filter 116*c* and 116*a* overlap each other at a border portion of the blue and red sub-pixel regions Pb and Pr.

Figure 8:
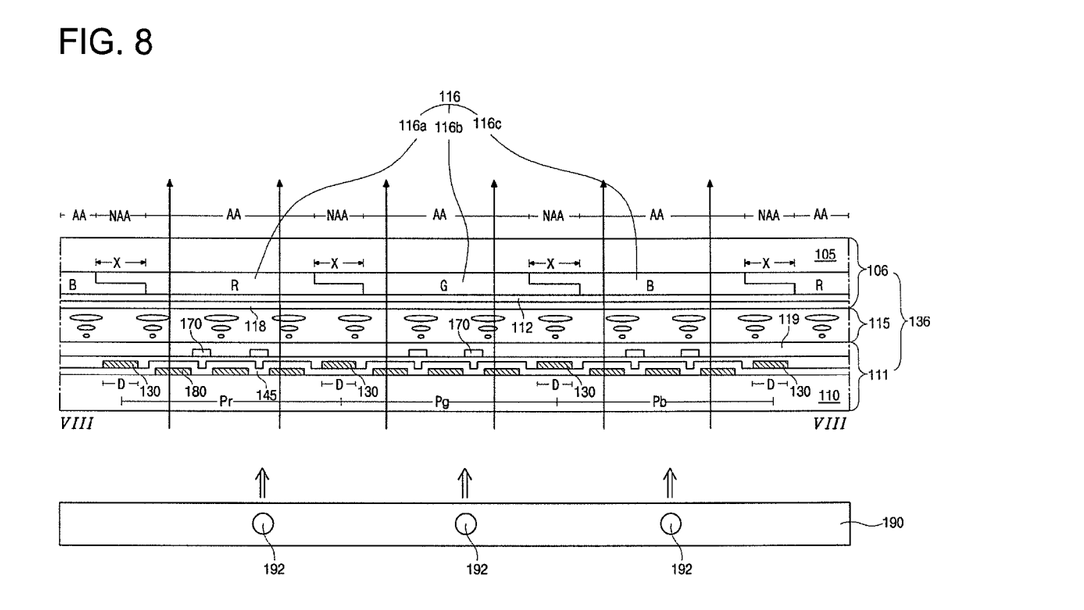
FIG. 8 is a cross-sectional view illustrating the IPS mode LCD device taken along a line VIII-VIII.

FIG. 8 is a cross-sectional view illustrating the IPS mode LCD device taken along a line VIII-VIII.

Referring to FIG. 8, the IPS mode LCD device includes a liquid crystal panel 136 including an array substrate 111, a color filter substrate 106 and a liquid crystal layer 115 having a cell gap between the array and color filter substrates 136 and 111, and a backlight unit 190 below the liquid crystal panel 136. The liquid crystal panel 136 includes a display region AA and a non-display region NAA between the display regions AA.

The non-display region NAA may corresponds to a data line 130, a gate line (120 of FIG. 5), and a thin film transistor (T of FIG. 5). A common electrode 130 is formed on a first substrate 110. A pixel electrode 170 and the common electrode 130 are alternately arranged in each of red (R), green (G) and blue (B) sub-pixel region Pr, Pg and Pb. A first alignment layer 119 is formed on the pixel electrode 170 and a connection portion (171 of FIG. 5). The sub-pixel regions Pr, Pg and Pb each may include the display region AA.

A color filter layer 116 including red, green and blue color filters 116a, 116b and 116c is formed on a second substrate 105. The adjacent color filters 116a, 116b and 116c may overlap each other with an overlapping width X at the non-display region NAA. The overlapping portion of the color filters 116a, 116b and 116c may shield the data line 130 and have the overlapping width X equal to or greater than that of the data line 130. The overlapping portion may function to prevent light from being emitted from the non-display region NAA. The non-display region NAA over the data line 120 may have a width equal or greater than the overlapping width X.

A planarization layer 112 may be formed on the color filter layer 116. A second alignment layer 218 is formed on the planarization layer 112. The first and second alignment layers 119 and 112 are rubbed to align liquid crystal molecules in rubbed directions.

Figure 9:
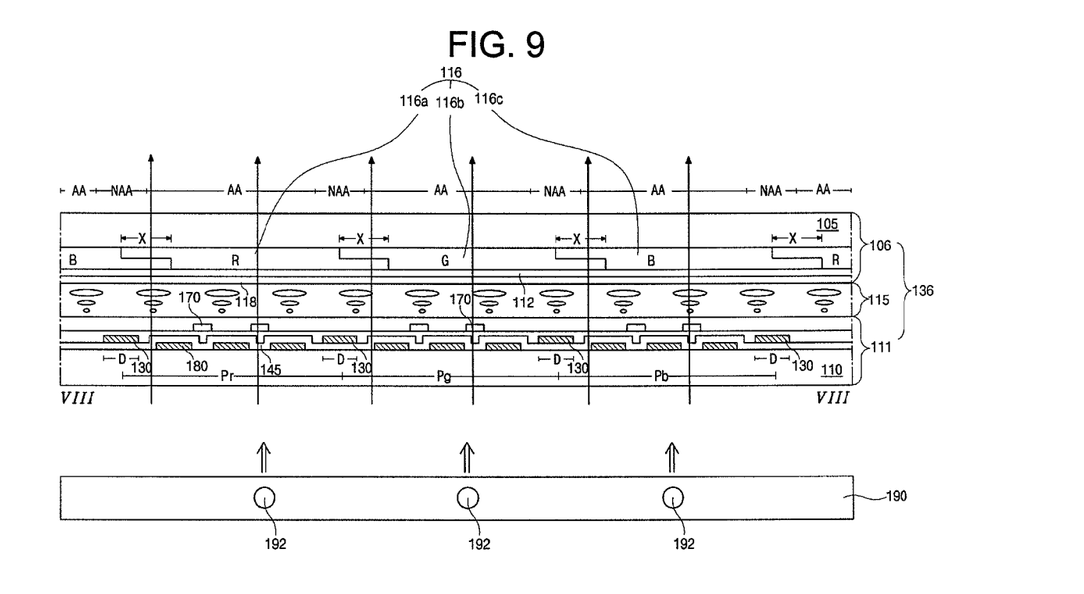
FIG. 9 is a cross-sectional view illustrating a state that the array substrate and the color filter substrate of the IPS mode LCD device according to the embodiment of the present invention are misaligned in attaching.

FIG. 9 is a cross-sectional view illustrating a state that the array substrate and the color filter substrate of the IPS mode LCD device according to the embodiment of the present invention are misaligned in attaching.

Referring to FIG. 9, the array substrate 111 and the color filter substrate 106 are misaligned in attaching. For example, compared to a state that the array substrate 101 and the color filter substrate 106 are normally attached as shown in FIG. 8, the color filter substrate 106 is shifted in the right direction relatively to the array substrate 111. Since the adjacent color filters 116a, 116b and 116c overlap each other with the overlapping width X, even though the misalignment of the array substrate 111 and the color filter substrate 106 occurs, color mixture can be prevented. For example, due to the misalignment, the red color filter 116a is shifted in the right direction and intrudes into the green sub-pixel region Pg. However, an edge portion of the green color filter 116b overlaps an edge portion of the red color filter 116a. Accordingly, even though light passes through the overlapped edge portion of the red color filter 116a at a peripheral region of the green sub-pixel region Pg, since the light is incident on the green color filter 116b, a red light emitted through the overlapped edge portion of the red color filter 116a can be prevented from being emitted through the green sub-pixel region Pg. In similar reason, undesired color light can be prevented form being emitted from the red and blue sub-pixel regions Pr and Pb. Accordingly, even though the misalignment occurs, the color mixture can be prevented.

The overlapping width X between the adjacent color filters 116a, 116b and 116c may be determined in consideration of various factors such as the width of the data line below the overlapped portion of the adjacent color filters 116a, 116b and 116c, a misalignment error, a aperture ratio, a light transmittance, and the like. For example, as the overlapping width X increase, the aperture ratio and light transmittance decreases. Accordingly, in consideration of the factors, the overlapping width X may be less than a width of the black matrix (14 of FIG. 3) in the related art. Further, the overlapping width X may vary according to model of the LCD device, for example, size of the LCD device.

Figure 10:
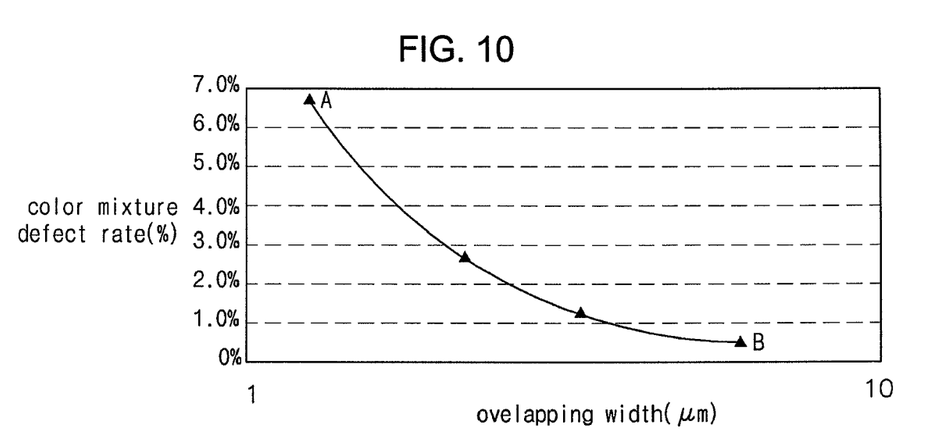
FIG. 10 is a graph illustrating a color mixture defect rate by an overlapping width of adjacent color filters in the IPS mode LCD device according to the embodiment of the present invention.

FIG. 10 is a graph illustrating a color mixture defect rate by an overlapping width of adjacent color filters in the IPS mode LCD device according to the embodiment of the present invention. The graph of FIG. 10 is taken in a case that a red color filter overlaps a blue color filter in a range of about 1 μm to 10 μm in a certain model of an IPS mode LCD device.

Referring to FIG. 10, the color mixture defect rate is about 6.3% at a point A, and the color mixture defect rate is about 0.3% at a point B. In other words, the graph shows that the color mixture defect varies according to the overlapping width. This kind of graph can be taken in various models of IPS mode LCD devices. Accordingly, graphs taken in model can be used to determine an appropriate overlapping width in a specific IPS mode LCD device.

As described in the embodiment of the present invention, the adjacent color filters overlap each other at the edge portions thereof. Light incident on the overlapped portion of the adjacent color filters can be prevented from passing therethrough. Accordingly, even though the misalignment of the array substrate and the color filter substrate occurs, the color mixture can be prevented. Further, the IPS mode LCD device does not use a black matrix and a sufficient aperture ratio can be obtained.

The embodiment regarding the IPS mode LCD device is mainly explained. However, the present invention can be employed in other mode LCD devices including an array substrate and a color filter substrate. For example, the present invention can be used for LCD devices including a pixel electrode in the array substrate and a common electrode in the color filter substrate and operated in a vertically induced electric field between the pixel and common electrode, such as a TN (twisted nematic) mode LCD device, a VA (vertical aligned) mode LCD device, an ECB (electrical controlled birefringence) mode LCD device and the like.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display device, comprising:
an array substrate including a gate line and a data line on a first substrate to define first and second sub-pixel regions and a thin film transistor in each of the first and second sub-pixel regions;
a color filter substrate including a color filter layer including first and second color filters corresponding to the first and second sub-pixel regions, respectively, wherein the first and second color filters overlap each other over the data line; and
a liquid crystal layer between the array substrate and the color filter substrate,
wherein the first color filter has a first step, and the second color filter has a second step, wherein the first and second steps contact each other to overlap each other such that the first and second color filters form a flat top surface, and wherein the first and second color filters have the same shape, and a plane area of an entire surface of an upper side of each of the first and second color filters is substantially the same as a plane area of an entire surface of a lower side of each of the first and second color filters.

2. The device according to claim 1, wherein an overlapping width of the first and second color filters is equal to or greater than a width of the data line.

3. The device according to claim 1, wherein the array substrate further includes a pixel electrode and a common electrode alternately arranged in each sub-pixel region.

4. The device according to claim 1, wherein the array substrate and the color filter substrate further include a pixel electrode and a common electrode, respectively.

5. The device according to claim 1, wherein the color filter substrate further includes a planarization layer on the color filter layer.

6. The device according to claim 1, wherein the first and second sub-pixel regions each include a display region to display images, and wherein a non-display region over the data line and between the display regions of the first and second sub-pixel regions has a width equal to or greater than an overlapping width of the first and second color filters.

* * * * *